May 3, 1949. J. S. CASE 2,468,960
VALVE DEVICE
Filed May 10, 1944 2 Sheets-Sheet 1
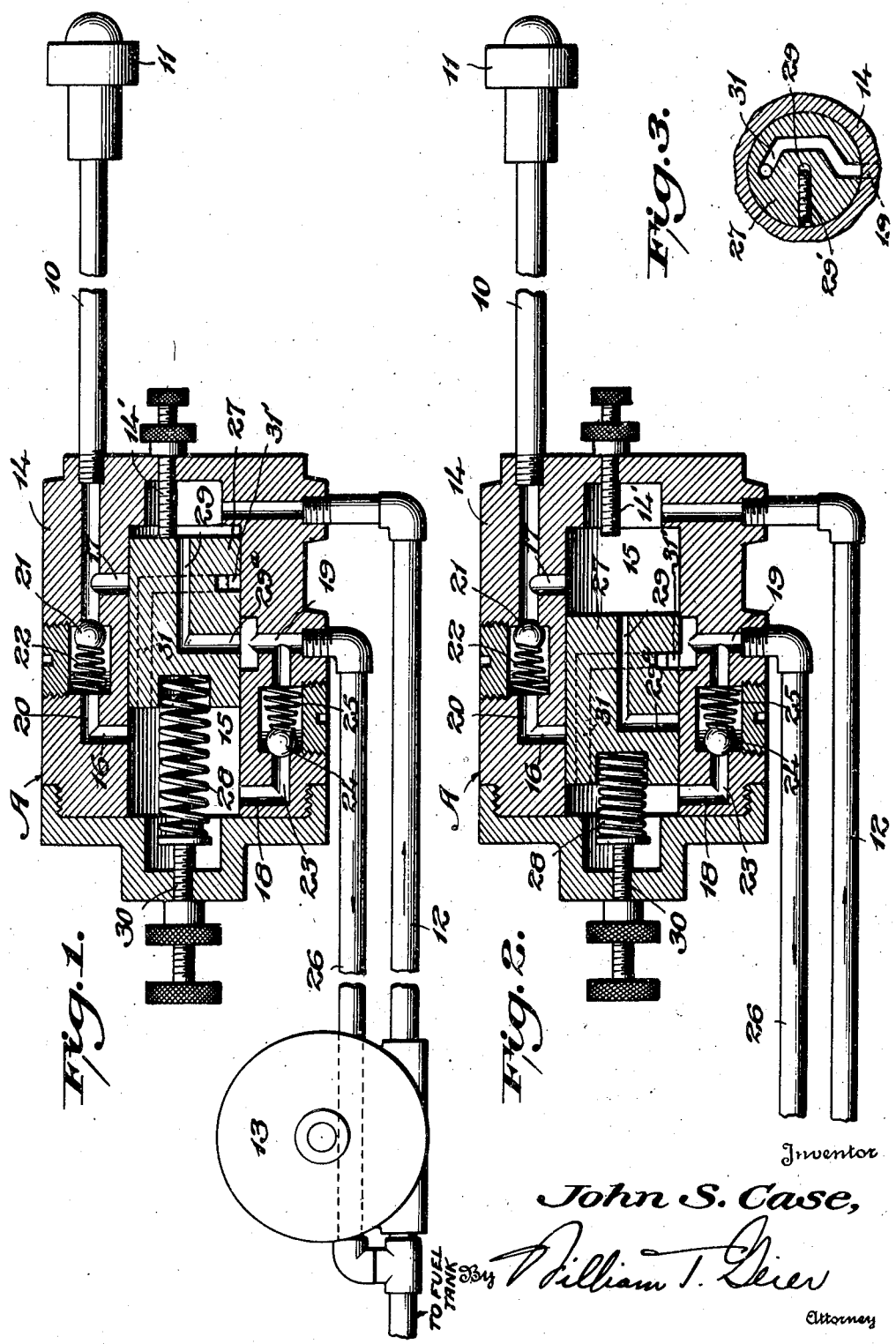
Inventor
John S. Case,
By William T. Geier
Attorney May 3, 1949.  J. S. CASE  2,468,960
VALVE DEVICE Filed May 10, 1944  2 Sheets-Sheet 2

Inventor
John S. Case,
By William T. Geier
Attorney

Patented May 3, 1949

2,468,960

UNITED STATES PATENT OFFICE 2,468,960

VALVE DEVICE

John S. Case, Baltimore, Md.

Application May 10, 1944, Serial No. 534,899

8 Claims. (Cl. 137—53)

This invention relates to valve devices, and has for one of its special and more important objects to provide a valve device, which, when embodied in a fluid pressure system having a discharge line, is operable automatically at the end of any given cycle of operation of the system not only to cut off flow of fluid to said line, but simultaneously to retract and thus drain fluid from said line, thereby to effect a quick, clean stoppage of flow of fluid to said line and to insure against fluid remaining therein and possibly escaping therefrom during the interval prior to the next cycle of operation of the system.

Another special and important object of the invention is to provide a valve device for the purpose stated which is effective, following its operation to cut off the flow of fluid to a discharge line and to drain fluid from such line, to require the fluid in the system to attain a predetermined pressure before it again is permitted to flow to the discharge line.

While, according to the invention, it is not essential that the fluid which is drained from the discharge line be returned to the supply line, another special and important object of the invention is to provide for return of the drained liquid to the supply line should that be desired.

Another special and important object of the invention is to provide a valve device for the purposes stated which is operable, or which may readily be rendered operable, to regulate the pressure of the fluid in a liquid pressure system in which the device is used.

Another special and important object of the invention is to provide a valve device for the purposes stated which is of simple, inexpensive, compact construction and which is thoroughly reliable and efficient in operation.

The device may advantageously be used in many different fluid pressure systems, as for example, in the fuel injection systems of Diesel-type internal combustion engines and in domestic oil burner systems of the high pressure, atomizing type to effect a quick, clean stoppage of oil flow to the fuel injector or burner nozzle, as the case may be; to clear the nozzle of any oil residue at the end of any given period of operation of the system and to return such residue to the oil supply line, and to insure the building up, to an effective atomizing pressure, of the oil before it is permitted to flow to the nozzle. In this connection it has been found that in liquid pressure systems such as mentioned, unless the oil is under an effective atomizing pressure at the beginning of any given cycle of operation of the system, and unless there is a quick, clean stoppage of oil flow to the nozzle at the end of any given cycle of operation of the system, incomplete combustion will occur at the beginning and end of each cycle of operation of the system, with consequent rapid and heavy deposit of soot in the combustion chamber, rapid forming of carbon on and in the fuel injector or burner nozzle, as the case may be, and its supply pipe, and rapid and progressive reduction in the efficiency of the system. Moreover, if oil is permitted to remain in the nozzle or its supply line at the end of any given cycle of operation of the system, and unless the oil is atomized effectively at the beginning of each period of operation of the system this may result in the occurrence of a damaging explosion.

Accordingly, a primary object of the invention is to provide a valve device which, when used in an engine fuel injection system, or in a domestic oil burner or like system of the type mentioned, is effective to overcome the aforementioned disadvantages inherent to most such systems at present in general use.

With the foregoing and other objects in view, which will become more fully apparent as the nature of the invention is better understood, the same consists in a valve device embodying the novel features of construction, combination and arrangement of parts and having the novel mode of operation as will be hereinafter more fully described, illustrated in the accompanying drawings and defined in the appended claims.

In the accompanying drawings, wherein like characters of reference denote corresponding parts in related views:

Fig. 1 is a diagrammatic sectional view through a valve device constructed in accordance with one practical embodiment of the invention and showing the parts of the device positioned to cut off flow of fluid from a supply line to a discharge line and to drain the latter line of fluid.

Figure 2 is a view similar to Figure 1 showing the parts of the device positioned to direct fluid from the supply line to the discharge line and to return fluid, drained from the discharge line, to the supply line.

Figure 3 is a fragmentary sectional view illustrating means for varying the effective cross sectional area of one of the ducts of the device.

Figure 4:
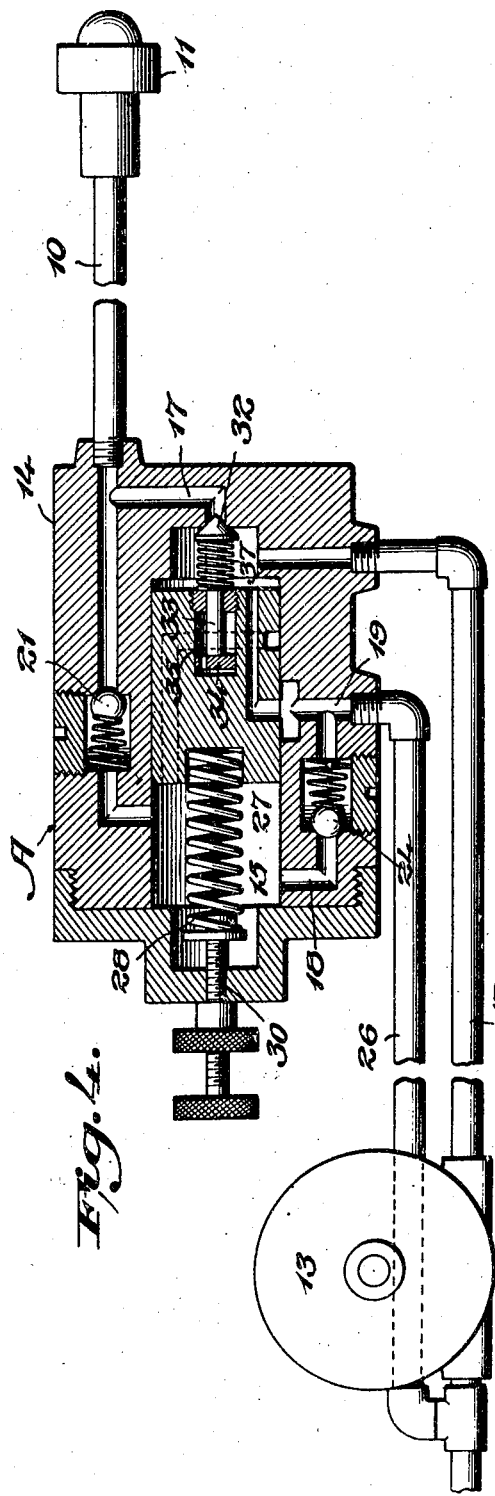
Figure 4 is a view similar to Figure 1 of an alternative form of the invention.

For convenience in illustrating and describing the present valve device and one particular advantageous use thereof, the same has been illustrated in the drawings as being embodied in an oil burner system of the high pressure atomizing type comprising an oil discharge pipe 10, a burner nozzle 11 connected to said discharge pipe at the discharge end thereof, an oil supply pipe 12 leading from an oil storage tank (not shown) and a pump 13 in said oil supply pipe 12 for forcing oil under pressure from the storage tank to said discharge pipe 10 and said nozzle 11. As aforesaid, however, the invention is not limited to this particular use, but is readily capable of use in other fluid pressure systems of either the liquid or gaseous type to serve some or all of the same or analogous purposes which it serves in an oil burner system. Moreover, it is to be understood that the present valve device may be constructed as a unit separate from any other unit of the system in which it is to be used, or it may be built into another unit such, for example, as a pump in accordance with the well-known practice of incorporating the control valves of high pressure, atomizing oil burner systems in the pumps of such systems.

Referring now particularly to the embodiment of the invention illustrated in Figures 1 and 2, it will be observed that the present device, designated generally as A, has, for clarity, been illustrated as a complete unit separate from the pump 13. It may, however, be built into the pump 13 or its equivalent as aforesaid. In either case it comprises a casing 14 having therein a chamber 15 of suitable diameter and length with one end of which the oil supply pipe 12 is connected and into the side of which opens two pairs of ducts 16, 17 and 18, 19, respectively.

The pair of ducts 16, 17, are shown as being alined longitudinally with respect to the chamber 15 and also as being spaced apart longitudinally with respect to said chamber. Moreover they are shown as being connected together by a duct 20 in which is arranged a check valve 21 which opens toward the duct 16 and closes toward the duct 17 and which constantly is biased toward closed position by a spring 22. The pair of ducts 18, 19, likewise are shown as being alined longitudinally with respect to the chamber 15 and also as being spaced apart longitudinally with respect to said chamber, and furthermore as being angularly spaced from the pair of ducts 16, 17, being disposed as shown, for example, diametrically opposite said pair of ducts 16, 17. Moreover, as in the case of the pair of ducts 16, 17, the pair of ducts 18, 19, are shown as being connected together by a duct 23 in which is arranged a check valve 24 which opens toward the duct 19 and closes toward the duct 18 and which constantly is biased toward closed position by a spring 25. It is to be understood, however, that the arrangement of the said ducts in the manner shown is not essential and that they may have specifically different arrangements to accomplish the same purposes as the arrangements shown.

The oil discharge pipe 10 is connected to the duct 17 and to the portion of the duct 20 which is at the same side of the check valve 21 as said duct 17. On the other hand, an oil return pipe 26 is connected at one end to the duct 19 and to the portion of the duct 23 which is at the same side of the check valve 24 as said duct 19, and at its other end is connected to either the oil tank or to the oil supply pipe 12 at a point between the oil tank and the pump 13.

The oil supply pipe 12 is connected to what will hereafter be referred to as the inner or rear end of the chamber 15, and it is toward this end of the said chamber that the ducts 17 and 19 are disposed, the ducts 16, 18 being disposed toward the other or front end of said chamber.

Snugly fitted in the chamber 15 and slidable longitudinally therein is a piston 27 which may be held against rotation in any suitable manner and which is constantly urged by a spring 28 toward its limit of movement at or near the rear end of said chamber, as determined by any suitable stop means, such, for example, as the adjustable stop screw 14' shown. The pump 13 may be of a type which acts, when operation thereof ceases, to seal or substantially seal the supply line 12, or it may be of a type which permits collapse of pressure in said supply line 12 when operation thereof ceases. If said pump is of the first-mentioned type the piston 27 is provided with an oil by-pass duct 29 which may be of suitable small cross sectional area throughout its length or at any point along its length and which may have associated therewith suitable means for adjusting its effective cross sectional area. In this connection and as illustrated by way of example in Figure 3 of the drawings, screw 29' may be threaded in the piston 27 and may extend into the duct 29 so that by adjusting said screw the effective cross sectional area of said duct may be varied.

One end portion of the oil by-pass duct 29 opens through the inner or rear end of the piston 27 into the inner or rear end of the chamber 15 and the other end portion 29a thereof opens through the side of said piston at a point for alinement with and disalinement from the duct 19 by longitudinal movement of said piston.

The spaced apart relationship of the ducts 16, 17, and 18, 19, longitudinally with respect to the chamber 15, and the location of the end portion 29a of the by-pass duct 29 longitudinally relative to the piston 27, are such that when said piston is at its limit of inward or rearward movement relative to the chamber 15, as shown in Figure 1, the duct 17 is covered by said piston against flow of oil thereto from the inner end of said chamber 15, the portion 29a of the duct 29 is alined with the duct 19, and the front end of said piston is spaced inwardly from the ducts 16 and 18. Moreover, the said spaced relationship of said ducts is such that, upon forward movement of the piston 27, the portion 29a of the duct 29 becomes disalined from the duct 19 substantially simultaneously with closing of the duct 16 by said piston and prior to opening of the duct 17 and then in opening of the duct 17, the duct 18 remaining at all times in communication with the front end portion of the bore 15.

From the foregoing, and assuming a condition of the valve device as shown in Figure 1, which corresponds to an idle condition of the oil burner, it will be apparent that, upon initiation of a cycle of operation of the burner, which involves starting of the pump 13, oil will be forced through the supply pipe 12 to the inner end of the chamber 15 and will by-pass back to the exhaust pipe through the by-pass duct 29 until it has attained a pressure sufficiently high to overcome the spring 28 and to force the piston 27 forwardly. In this connection, the duct 29 is of such small effective cross sectional area that upon continued operation of the pump 13 the pressure of the oil in the inner end of the chamber 15 will progressively rise until it is relieved other than through said duct. Moreover, suitable means, such, for example, as the screw means illustrated in the drawings and designated as 30, preferably is provided for variably predetermining the force exerted by the spring 28 so that the piston 27 will not be moved forwardly by the oil until the oil has attained a pressure at least as high as is required to cause it to be effectively atomized when delivered through the nozzle 11.

When the oil has attained a pressure sufficiently high to force the piston 27 forwardly, consequent forward movement of the piston will result in closing of the ducts 16 and 29 and in opening of the duct 17. Thereupon, by-passing of the oil through the duct 29 will cease and the oil will flow from the supply pipe 12 via the chamber 15 and the duct 17 to the discharge pipe 18 and to the nozzle 11 at an effective atomizing pressure. Moreover, as the piston 27 moves forwardly, any oil contained in the forward portion of the chamber 15 will be forced therefrom substantially simultaneously by said piston through the ducts 18, 23 and 19 into the oil return pipe 26, by which it will be returned to the oil tank or to the oil supply pipe 12, as the case may be, for subsequent delivery to the nozzle 11 by the pump 13. Alternatively and as will be apparent, oil forced from the forward end of the chamber 15 need not be returned to the system but may be directed elsewhere if desired.

The piston 27 will continue to move forwardly until it has reached its limit of forward movement, as determined by any suitable stop means, or until its pressure balances the force exerted by the spring 28. It then will remain in a forwardly disposed, operative position, as illustrated by way of example in Figure 2, until operation of the pump 13 ceases at the end of an operating period of the burner.

At the end of any given period of operation of the burner, the spring 28 will force the piston 27 rearwardly and maintain a desired atomizing pressure on the oil until the port 17 is closed by said piston. Simultaneously, oil will be forced from the inner or rear end of the chamber 15 to the oil return pipe 26 by way of the duct 29, the check valve 24 will close the duct 18 against entry of oil into the front end portion of the chamber 15 from the oil return pipe 26 and oil therefore will be drawn into the said front end portion of said chamber from the oil discharge pipe 18, thus at least partially draining said discharge pipe and the nozzle 11 of oil.

If the pump 13 is of a type which does not act, when operation thereof ceases, to seal the supply line 12, the duct 29 is unnecessary and may be eliminated, since inward movement of the piston 27 by the spring 28 simply will result in forcing oil from the inner end of the chamber 15 back into the supply line 12. The piston 27 is provided with a duct 31 one end of which opens through the front end of said piston into the front end of the chamber 15 and the other end 31' of which opens through the side of said piston for alinement with and disalinement from the duct 19. In this connection it will be noted that the spaced relationship of the ducts 16 and 19 longitudinally of the casing 14, and the location of the end 31' of the duct 31 relative to the ends of the piston 27, are such that, upon forward movement of said piston, the end 31' registers with the duct 19 as the piston closes the duct 16 and, upon rearward movement of said piston, becomes disalined from said duct 19 as the piston uncovers said duct 16. It will also be noted that the end of the duct 19 which opens into the chamber 15 is elongated, so that the end 31' of the duct 31 registers therewith as long as the piston is in a forwardly disposed position covering the duct 16. It will be apparent, therefore, that the duct 31 vents the front end of the chamber 15 as long as the piston 27 covers the duct 16 and thus permits free movement of the piston by the fluid pressure and the spring 28, until the piston moves inwardly to a position uncovering the duct 16, whereupon sealing of said duct 31 by the casing 14 results in said piston acting to produce a negative pressure in the front end of the chamber 15 with consequent drawing of oil into the same from the discharge line 18 and the nozzle 11, as the piston 27 is moved inwardly by the spring 28. Accordingly, if the pump 13 is of the non-sealing type, the duct 29 is not essential and may be eliminated. When fluid pressure is built up in the rear of cylinder 15 in excess, so as to overcome spring 28, a by-pass will be established with the duct 19 to allow the fluid to escape back to the exhaust pipe 26.

Figure 5:
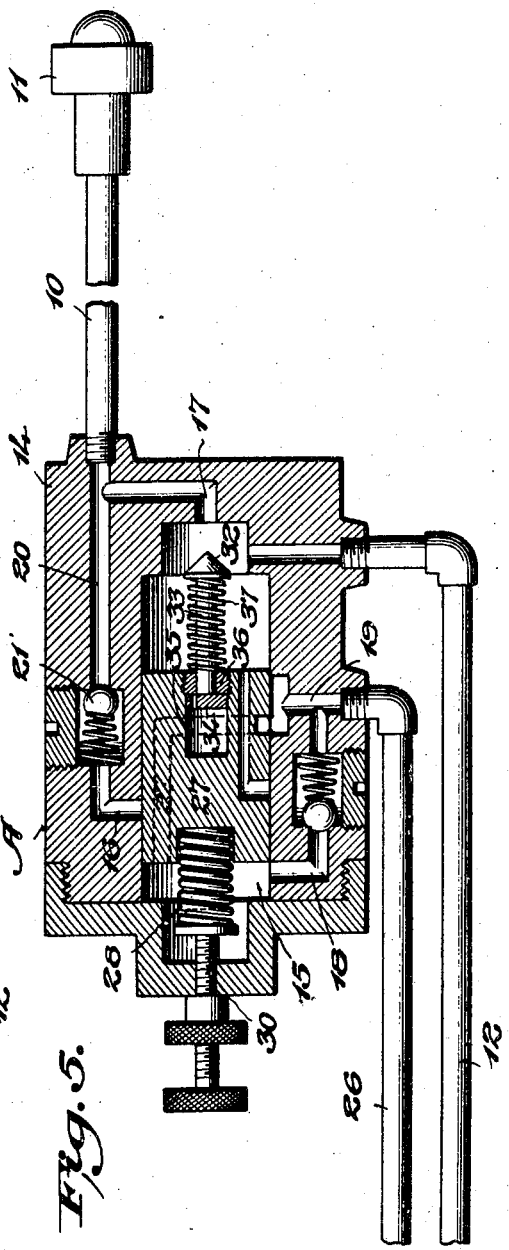
Figure 5 is a view similar to Figure 2 of the alternative form of the invention shown in Figure 4.

Referring now more particularly to the embodiment of the invention illustrated in Figures 4 and 5 of the drawings, it will be observed that the construction is the same in all essential respects as the construction illustrated in Figures 1 and 2, except that the duct 17 opens into the rear end of the chamber 15 and flow of oil through the same from the said rear end of said chamber 15 to the discharge pipe 18 and the nozzle 11 is controlled by a valve 32 carried by the piston 27.

The valve 32 projects from the rear end of the piston 27 for opening and closing cooperation with the duct 17 and is suitably mounted for limited longitudinal movement, rearwardly in particular, relative to said piston in any suitable manner. For example, the front end portion of the stem 33 of said valve may carry a head 34 which may be disposed in a longitudinally elongated bore 35 in the piston 27, and the wall 36 which closes the rear end of said bore 35 and through which the stem 33 extends, may serve as a stop engageable by said head 34 to limit rearward movement of the valve 32 relative to said piston 27. In any event, a suitable spring 37 such, for example, as an expansion coil spring surrounding the stem 33 and interposed between the valve 32 and the wall 36, tends constantly to urge said valve 32 toward its limit of rearward movement relative to the piston 27. Moreover, the arrangement is such that, when the piston 27 is at its limit of rearward movement in the chamber 15, as determined by stop means such as 14' of Figure 1, or any other suitable stop means as 14', the valve 32 is in a forwardly disposed position relative to said piston 27. Thus, as the piston 27 moves forwardly, the spring 37 maintains the valve 32 closed with respect to the duct 17 until the head 34 engages the wall 36. Further forward movement of the piston 27 then positively carries the valve 32 forwardly therewith whereby the duct 17 is opened. The pressure of the oil required to move the piston 27 forwardly an amount to open the valve 32 is at least as high as is required to insure effective atomization of oil delivered through the nozzle 11. Accordingly, the Figures 4 and 5 construction insures, as in case of the Figures 1 and 2 construction, an effective atomizing pressure of the oil before it is delivered to the nozzle 11.

When, at the end of any given period of operation of the burner, the spring 28 returns the piston 27 to its normal rearmost position, the valve 32 closes the duct 17 and the piston moves rearwardly relative to said valve, thereby compressing the spring 37 so the latter is effective to maintain said valve closed during initial forward movement of the piston at the beginning of the next period of operation of the burner. By making the chamber 35 of such length that the wall at its inner end is engaged by the head 34 as the piston approaches its limit of rearward movement, the entire pressure of the main spring 28 may be brought to bear on the valve 32 to cause the latter to more positively close. In other respects the construction and mode of operation is the same as the Figures 1 and 2 embodiment of the invention.

The head 34 may be provided with an opening affording communication between the ends of the bore 35 or any equivalent means may be provided, so that if oil should leak into the bore 35 it will not interfere with free movement of the valve 32 longitudinally relative to the piston 27.

Summarizing, it will be apparent that the present valve device will operate automatically to drain the discharge pipe 10 and the nozzle 11 of oil at the end of any given period of operation of the burner and to insure a pressure of the oil sufficiently high to effectively atomize the oil delivered through the nozzle 11 before any oil will be delivered to said nozzle at the beginning of any given period of operation of the burner, with all attendant advantages.

While the device may or may not be used as a pressure regulator, it will be apparent that the duct 19 may be disposed to be uncovered by forward movement of the piston 27 when said piston reaches any given position, thus to establish by-pass communication between the supply line 12 and the return line 26 through the inner end portion of the chamber 15. Accordingly, the pressure will be maintained within a range at which it will force the piston sufficiently far forwardly to uncover the duct 17 but not so far forwardly as to sufficiently uncover the port 19 to permit the pressure to collapse.

The device obviously may be employed in gaseous as well as liquid pressure systems.

From the foregoing description considered in connection with the accompanying drawings, it is believed that the construction and operation of the present valve device will be clearly understood and its advantages appreciated. It is desired to point out, however, that while only certain specific structural embodiments of the device has been illustrated and described, the same is readily capable of embodiment in specifically different mechanical structures within its spirit and scope as defined in the appended claims.

I claim:

1. A valve device of the character described including, a casing having a chamber therein provided with an inlet, an outlet and an exhaust, a piston movable in said chamber having a pair of spaced by-pass passages therethrough, one of which establishes communication between the inlet and the exhaust when the piston is at the forward end of the chamber and the other of which establishes communication with the opposite end of the chamber and the exhaust when the piston is at the rear end of the chamber, said casing having a by-pass passage affording communication between the outlet and said rear end of the chamber and a second by-pass passage affording communication between the rear end of the chamber and the exhaust, a check-valve in each of said last-mentioned by-pass passages, and means constantly biasing the piston toward the forward end of the chamber so as to normally deny communication between the inlet and the outlet of the chamber.

2. A valve device in accordance with claim 1 wherein there is an auxiliary valve carried by the piston for denying communication between the inlet and the outlet when the piston is in position adjacent the forward end of the chamber.

3. A control valve comprising a casing having an inlet, an outlet, and an exhaust, and a movable valve in said casing having a passage therethrough and normally biased to a position for establishing communication between the inlet and exhaust through said passage and for denying communication between the inlet and outlet when the pressure of fluid flowing through the inlet is below a predetermined point, said valve being movable toward another position for establishing communication between the inlet and outlet and for denying communication between the inlet and exhaust through said passage when the pressure of fluid flowing through said inlet reaches or exceeds said predetermined point, said movable valve having a second passage independently of said first-named passage for establishing communication between the casing and the exhaust when the valve is in said position for establishing communication between the inlet and outlet.

4. A control valve comprising, a casing having an inlet, an outlet, and an exhaust, a piston reciprocable in said casing, spring means tending constantly to shift said piston toward one end of said casing, adjustable stop means to limit movement of the piston by the spring means, the inlet being in constant communication with said end of the casing whereby the piston is movable toward the other end of the casing by fluid entering the inlet when the pressure thereof exceeds the force exerted upon the piston by said spring means, means whereby communication between the inlet and outlet is denied when the piston is at its limit of movement toward the first mentioned end of said casing and until said piston is moved a predetermined distance toward the second mentioned end of the casing, means whereby movement of the piston toward the first mentioned end of the casing to deny communication between the inlet and outlet partially draws fluid through the outlet and into the second mentioned end of the casing, and means whereby movement of the piston toward the second mentioned end of the casing effects movement of fluid from the second mentioned end of the casing toward and through the exhaust.

5. A control valve comprising, a casing having an inlet, an outlet, and an exhaust, a piston reciprocable in said casing, spring means tending constantly to shift the piston toward one end of the casing, stop means to limit movement of the piston by said spring means, said inlet being in constant communication with said end of the casing whereby said piston is movable toward the other end of the casing by fluid entering the inlet when the pressure thereof exceeds the force exerted upon the piston by the spring means, means whereby communication between the inlet and the outlet is denied when the piston is at its limit of movement toward the first mentioned end of said casing and until said piston is moved a predetermined distance toward the second mentioned end of the casing, a fluid connection between the outlet and the second mentioned end of the casing, a check valve in said connection closing toward the outlet and opening toward the second mentioned end of the casing whereby movement of the piston toward the first mentioned end of the casing to deny communication between said inlet and outlet draws fluid through the outlet past the valve and into the second mentioned end of the casing, and a fluid connection between the second mentioned end of the casing and the exhaust including a check valve closing toward the second mentioned end of the casing whereby movement of the piston toward the second mentioned end of the casing effects movement of fluid from the second mentioned end of the casing toward and through the exhaust.

6. A control valve comprising, a casing having an inlet, an outlet, and an exhaust, a reciprocating piston in said casing, spring means tending constantly to shift said piston toward one end of the casing, stop means to limit movement of the piston by said spring means, said inlet being in constant communication with said one end of the casing whereby the piston is movable toward the other end of the casing by fluid entering the inlet when the pressure thereof exceeds the force exerted on the piston by the spring means, means whereby communication between the inlet and outlet is denied when the piston is at its limit of movement toward the first-mentioned end of the casing and until the piston is moved a predetermined distance toward the second mentioned end of the casing, a connection between the side of the casing and the exhaust normally closed to the first mentioned end of the casing by the piston except when the latter is substantially at its limit of movement toward the first mentioned end of the casing, said piston having a duct affording communication between the first mentioned end of the casing and the connection when the piston is at or adjacent to its limit of movement toward the first-mentioned end of the casing whereby fluid flowing into the first-mentioned end of the casing through the inlet will flow through the exhaust until the fluid has attained a pressure sufficiently high to shift the piston toward the second mentioned end of the casing against the forces of the spring means, and valved connections between the second mentioned end of the casing and the outlet and exhaust, respectively, whereby movement of the piston toward the first-mentioned end of the casing draws fluid through the outlet and into the second mentioned end of the casing and whereby movement of the piston toward the second mentioned end of the casing effects flow of said fluid toward and through the exhaust.

7. A control valve comprising, a casing having an inlet and an outlet, a reciprocating piston in the casing, spring means tending constantly to shift the piston toward one end of the casing, stop means to limit movement of the piston by the spring means, the inlet being in constant communication with said end of the casing, whereby the piston is movable toward the other end of the casing by fluid entering said inlet when its pressure exceeds the force exerted upon the piston by the spring means, the outlet communicating with the side of the casing at a point covered by the piston when the latter is at its limit of movement toward the first mentioned end of the casing and uncovered by a predetermined amount of movement of the piston toward the second-mentioned end of the casing, whereby the fluid entering through the inlet must attain a pressure sufficient to overcome said spring means and to shift the piston toward the second mentioned end of the casing in order to establish communication between said inlet and outlet, a valved connection between the outlet and the second mentioned end of the casing whereby movement of the piston toward the first mentioned end of the casing to deny communication between the inlet and outlet effects withdrawal of fluid from the outlet and into the second mentioned end of the casing, and a valved connection between the second mentioned end of the casing and the exhaust whereby movement of the piston towards the second mentioned end of the casing effects return of the fluid so withdrawn toward and into the exhaust.

8. A valve device including a fluid pressure regulator comprising a casing having a chamber therein provided with an inlet and outlet and exhaust, a piston movable in said chamber having a pair of spaced by-pass passages therethrough, one of which establishes communication between the inlet and the exhaust when the piston is at or adjacent the rearward end of the chamber, and the other of which establishes communication with the opposite end of the chamber and the exhaust when the piston is at or adjacent the forward end of the chamber, a spring tending to bias said piston to the rearward end of the chamber until the force of the fluid pressure in the rearward end of the chamber exceeds the force of the spring biasing means and moves the piston forwardly to by-pass fluid to the outlet and on excess fluid pressure to by-pass fluid directly to the exhaust.

JOHN S. CASE.

REFERENCES CITED

The following references are of record in the file of this patent:

UNITED STATES PATENTS

| Number | Name | Date |
|---|---|---|
| 976,917 | Richards | Nov. 29, 1910 |
| 1,110,567 | McAuley | Sept. 15, 1914 |
| 1,217,958 | Klahre | Mar. 6, 1917 |
| 1,889,517 | Roessler | Nov. 29, 1932 |
| 1,892,335 | Engel | Dec. 27, 1932 |
| 1,998,223 | Czarnecki | Apr. 16, 1935 |
| 2,021,613 | Sheppard | Nov. 19, 1935 |
| 2,094,171 | Hoffer | Sept. 28, 1937 |
| 2,103,299 | Ravnsbeck | Dec. 28, 1937 |
| 2,159,720 | Wahlmark | May 23, 1939 |
| 2,247,421 | Tabb | July 1, 1941 |
| 2,257,702 | Murphy | Sept. 20, 1941 |
| 2,279,176 | Pardee | Apr. 7, 1942 |
| 2,307,330 | Ofeldt | Jan. 5, 1943 |
| 2,324,120 | Taper | July 13, 1943 |

FOREIGN PATENTS

| Number | Country | Date |
|---|---|---|
| 38,935 | Netherlands | Sept. 15, 1936 |